Jan. 21, 1930. J. H. PHILLIPS Re. 17,569
FLEXIBLE PIPE
Original Filed March 11, 1924
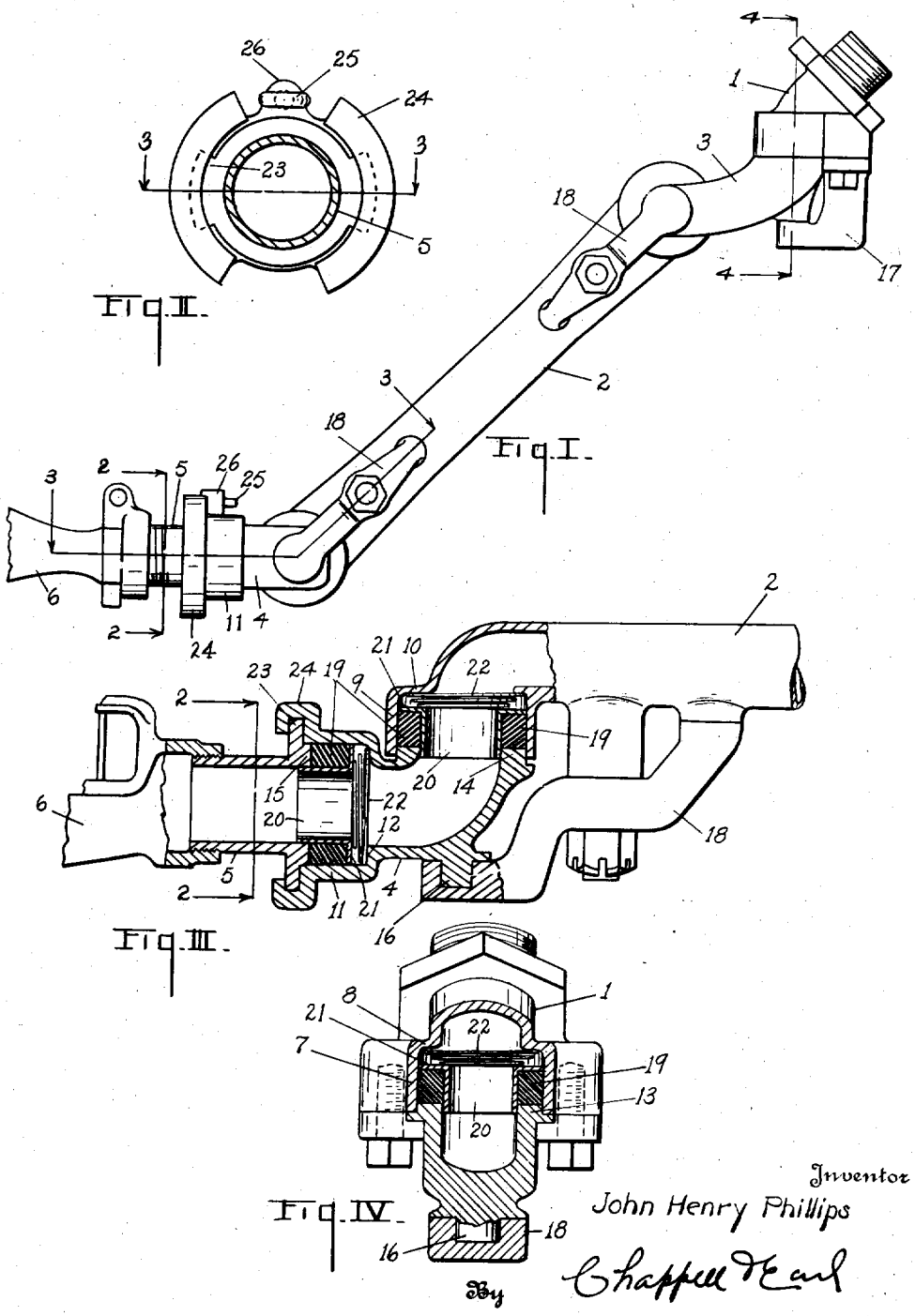
Inventor
John Henry Phillips
By Chappell Earl
Attorney Reissued Jan. 21, 1930 Re. 17,569

UNITED STATES PATENT OFFICE

JOHN H. PHILLIPS, OF JACKSON, MICHIGAN

FLEXIBLE PIPE

Original No. 1,547,402, dated July 28, 1925, Serial No. 698,431, filed March 11, 1924. Application for reissue filed July 28, 1927. Serial No. 209,150.

This invention relates to improvements in flexible pipes.

My improvements are particularly designed by me as a substitute for the rubber coupling hose commonly employed on train pipes and in the accompanying drawing I have illustrated my improvements as I have embodied them for that purpose. My improvements are, however, adapted for use in other relations where pipe joints are required.

The main objects of my invention are:

First, to provide an improved flexible pipe, the joints of which are well adapted to withstand heavy pressure without leaking.

Second, to provide an improved flexible pipe which has the required flexibility to permit the ready joining or coupling of the coacting pipes, as in coupling a train.

Third, to provide an improved flexible pipe joint having these advantages which is simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail side view of a train pipe coupling embodying the features of my invention.

Fig. II is a transverse section on a line corresponding to line 2—2 of Figs. I and III.

Fig. III is a detail view partially in longitudinal central section on a line corresponding to line 3—3 of Figs. I and II.

Fig. IV is a detail section on a line corresponding to line 4—4 of Fig. I.

In the drawings similar reference characters refer to similar parts throughout the several views, and the sectional views are taken looking in the direction of the little arrows at the ends of the section lines.

Referring to the drawings, my improved flexible pipe comprises the supporting member 1 adapted to be mounted upon a railway car and connected to the air or steam pipe thereof, the pipe section 2, the upper joint member 3, the lower joint member 4 and the coupling member 5 which has secured thereto one of the standard types of train pipe couplings 6.

The supporting member 1 has a downwardly facing cylindrical socket 7 having a shoulder 8 at the inner end thereof. The pipe section 2 has laterally facing cylindrical sockets 9 corresponding with the shoulder 10 and its inner end corresponding to the socket and shoulders of the member 1. The member 4 has a longitudinally disposed socket 11 with a shoulder 12 at its inner end corresponding to the sockets and shoulders described. The member 3 has a vertically disposed cylindrical nipple 13 coacting with the socket 7 of the member 1 and rotatable therein and a corresponding laterally disposed nipple coacting with the rotatably disposed socket 9 of the member 2.

The member 4 has a nipple 14 rotatable within the socket 9 at the lower end of the section 2, while the coupling member 5 has a nipple 15 rotatable within the socket of the member 4. The joint members 3 and 4 have journals or pivot studs 16 axially aligned with the nipples, these journals being engaged by the members 17 and 18 carried by the members 3 and 2 respectively, so that the parts are rotatably secured together, these members 17 and 18 being detachably secured as is indicated and formed with cylindrical bearing recesses $16^a$ to receive the journals 16 with a close fit, loose enough, however, to permit easy rotation of the journals therein.

Annular gaskets 19 are arranged, slidably to take up wear within the sockets to engage the ends of the nipples, these gaskets being shorter than the recesses in the sockets to provide pressure spaces back of the gaskets and being supported by the sleeves 20 which are arranged through the gaskets to extend into the nipples and are provided with outwardly projecting flanges 21 at their outer ends which are engaged by the coiled springs 22, thereby yieldingly pressing the gaskets against the nipples. These sleeves prevent the gaskets bulging or collapsing inwardly so that the expansion of the gaskets under the heat of steam, in a steam train pipe connection, is outwardly against the wall of the gasket socket or recess to provide proper sealing, the sleeves also providing an effective means for transmitting the pressure of the springs thereto, and greatly add to the life of the gaskets. The primary purpose of the springs is to hold the gaskets in place when the flexible conduit structure is not subject to internal pressure. When steam, for example, is passing through the conduit it will maintain the gaskets in operative contact with the internal surfaces of the sockets and with the ends of the nipples.

The coupling member 5 is provided with opposed segmental lugs 23 which may be engaged with the segmental channeled flanges 24 of the member 4 by rotative movement of the parts. The disengagement of the parts is prevented by means of the cotter pin 25 disposed through the lug 26 on the coupling member 4. This permits rotative movement of the coupling 6 when the train pipes of two cars are coupled and accommodates any movement to which they may be subjected in use.

Structures embodying my improvements have sufficient flexibility or freedom of movement for use on train pipes, are easily coupled and uncoupled and are very durable. The several joints are not likely to leak. My improvements are especially designed for train pipes but are desirable for use in various relations. I have not attempted to illustrate or describe such adaptations which might be desirable as I believe the disclosure made will enable those skilled in the art to which my invention relates to embody or adapt the same as may be desired.

Having thus described my invention, what I claim as new and desire to secure by Letters Patent, is:

1. A flexible pipe joint comprising a female joint member having a cylindrical socket with a shoulder at the bottom thereof, a male joint member having a nipple rotatable within said socket, an annular gasket of resilient material arranged within said socket to engage the end of said nipple, a supporting sleeve disposed through the gasket into said nipple and having an outwardly projecting flange supporting the inner end of said gasket, and a coiled spring arranged on said shoulder to engage the inner end of said supporting sleeve.

2. A flexible pipe joint comprising a female joint member having a cylindrical socket, a male joint member having a nipple rotatable within said socket, an annular gasket of resilient material arranged within said socket to engage the end of said nipple, a supporting sleeve disposed through the gasket into said nipple and having an outwardly projecting flange supporting the inner end of said gasket, and a coiled spring arranged within said socket to engage the inner end of said supporting sleeve.

3. A flexible pipe joint comprising a female joint member having a cylindrical socket, a male joint member having a nipple exteriorly cylindrical to fit, rotatably, in said socket, an annular gasket of resilient material arranged within said socket to bear against the end surface of said nipple, a gasket supporting sleeve disposed through the gasket and overlapping the interior surface of said nipple, and a coiled spring arranged within said socket to engage the inner end of said supporting sleeve.

4. In a structure of the class described, the combination of a female joint member having a longitudinally disposed cylindrical socket and provided with segmental inwardly facing flanges and a lug disposed between said flanges, a male joint member provided with a nipple rotatable within said socket and having lugs engageable with said channeled flanges by a rotative movement, and a pin disposed through said first mentioned lug to project into the path of said lugs on said male joint member to prevent disengagement of the joint members.

5. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, said joint members having supporting journals axially aligned with their said nipples, the lower joint member having a longitudinally disposed cylindrical socket at its outer end and inwardly facing opposed segmental channeled flanges retaining members mounted upon said supporting member and pipe section to engage the said journals of said joint members whereby the parts are rotatably connected, a coupling member having a nipple rotatable within the socket at the outer end of said lower joint member, said coupling member having segmental lugs engageable with its said channeled flanges, and gaskets disposed within said several sockets to engage the ends of their coacting nipples.

6. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, the lower joint member having a longitudinally disposed cylindrical socket at its outer end, a coupling member having a nipple rotatable within the socket at the outer end of said lower joint member, means for securing said members together permitting rotative movement thereof, and annular gaskets disposed with capacity for sliding, lengthwise movement to take up wear within said several sockets so as to be maintained by fluid pressure in operative contact with the interior surfaces of the sockets and with the ends of their coacting nipples.

7. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, the lower joint member having a longitudinally disposed cylindrical socket at its outer end, and annular gaskets disposed with capacity for sliding, lengthwise movement to take up wear within said several sockets so as to be maintained by internal fluid pressure in operative contact with the interior surfaces of the sockets and with the ends of their coacting nipples.

8. In a structure of the class described, the combination of a supporting member and a pipe section, upper and lower joint members, said supporting member and upper joint member having coacting socket and nipple relatively rotatable one within the other on an approximately vertical axis, said pipe section and said upper and lower joint members having laterally disposed coacting sockets and nipples relatively rotatable one within the other on approximately horizontal axes, said joint members being provided with journals axially aligned with said sockets and nipples, retaining members mounted on said supporting member and pipe section having bearing recesses to receive said journals on said joint members whereby the parts are rotatably connected, a coupling member, the lower joint member and said coupling member having longitudinally disposed rotatably associated coacting socket and nipple, and gaskets disposed within the several sockets to coact with their coacting nipples.

9. In a structure of the class described, the combination of two conduit members, a joint member, means providing rotative connections between the ends of the joint member and the conduit members, comprising in each case a socket, a nipple extending into said socket, and a gasket slidably arranged in the socket to bear against the nipple.

10. In a flexible conduit structure for supporting a coupler on a train pipe, the combination of conduit members; means for flexibly articulating one such member with another comprising interfitting cylindrical elements, the outer one of which is formed with a gasket recess, and means for maintaining said elements in rotative relation with each other, without substantial endwise pressure of one on the other when the conduit is subject to internal fluid pressure; an annular gasket slidably arranged to take up wear in said recess which bears against the end of the inner element and is shorter than said recess to provide a pressure space back of the end of the gasket; a spring bearing against the inner end of the gasket tending to maintain it in sealing position; and a metallic sleeve extending through said gasket overlapping the adjacent conduit member and formed with a flange against which said spring bears.

11. In a flexible conduit structure for supporting a coupler on a train pipe, the combination of elbow-shaped conduit members having rotative interfitting cylindrical elements, the outer one of which is formed with a gasket recess; a journal on one of said conduit members coaxial with said cylindrical elements; means on the other conduit member providing a socket with which the journal has a close rotative fit; and an annular gasket slidably arranged to take up wear in said gasket recess which bears against the end of said inner cylindrical element and is shorter than said recess to provide a pressure space back of the end of said gasket.

12. In a flexible conduit structure for supporting a coupler on a train pipe, the combination of elbow-shaped conduit members having rotative interfitting cylindrical elements, the outer one of which is formed with a gasket recess; a journal on one of said conduit members coaxial with said cylindrical elements; means on the other conduit member providing a socket with which the journal has a close rotative fit; an annular gasket slidably arranged to take up wear in said gasket recess which bears against the end of said inner cylindrical element and is shorter than said recess to provide a pressure space back of the end of said gasket; a spring bearing against the inner end of the gasket tending to maintain it in sealing position; and a metallic sleeve extending through said gasket, overlapping the adjacent conduit member and formed with a flange against which said spring bears.

13. In a flexible conduit structure for supporting a coupler on a train pipe, the combination of conduit members having rotative interfitting elements, one of which members is formed with a cylindrical gasket recess; a journal on one of said conduit members and means providing a socket for said journal on the other member, which journal and socket are coaxial with said interfitting elements whereby said members have relative movement by rotation only and on a single axis; and an annular gasket which fits slidably in said gasket recess, bears endwise against said other element and is shorter than said recess to provide a pressure space back of said gasket.

14. In a flexible conduit structure for supporting a coupler on a train pipe, the combination of elbow shaped conduit members having rotative interfitting elements, one of which members is formed with a cylindrical gasket recess; a journal on one of said conduit members and means providing a socket for said journal on the other member, which journal and socket are coaxial with said interfitting elements whereby said members have relative movement of rotation only and on a single axis, and an annular gasket which fits slidably in said gasket recess, bears endwise against said other element and is shorter than said recess to provide a pressure space back of said gasket.

15. In a flexible conduit structure for supporting a coupler on a train pipe, the combination of a supporting member, a pipe section member having elbow shaped ends, a coupling member, upper and lower elbow shaped joint members, means for engaging said members one with another, permitting relative movement only of rotation and on a single axis, in each case, one of each pair of members so engaged being formed with a cylindrical gasket recess, and an annular gasket slidably fitting in and shorter than each recess and bearing on the other adjacent member, the engaging means between said pipe section and joint members comprising, in each case, a journal on one member and a socket on the other member to receive said journal.

16. In a flexible conduit structure for supporting a coupler on a train pipe, the combination of a supporting member, a pipe section member having elbow shaped ends, a coupling member, upper and lower elbow shaped joint members, means for engaging said members one with another, permitting movement only of rotation and on one axis, in each case, one of each pair of members so engaged being formed with a cylindrical gasket recess, an annular gasket slidably fitting in and shorter than each recess and bearing on the other adjacent member, the engaging means between said pipe section and joint members comprising, in each case, a journal on one member and a socket on the other member to receive said journal; and rigid sleeves in said gaskets whereby radial expansion of the gaskets when heated develops sealing pressure against the walls of said gasket recesses.

17. In a flexible conduit structure for supporting a coupler on a train pipe, the combination of elbow shaped conduit members having interfitting end portions, one of the members having a cylindrical gasket recess, there being an annular sleeve bearing between interfitting portions of the conduit members, a journal on one of the conduit members and a socket member for receiving the journal on the other conduit member, this journal and socket bearing being external of one of the elbows and coaxial with the sleeve bearing whereby said conduit members have relative movement by rotation only on a single axis, and an annular gasket which fits slidably in said gasket recess, bears endwise against an end portion of the other conduit member and is shorter than said recess to provide a pressure space back of the gasket.

18. In a flexible conduit structure for supporting a coupler on a train pipe, the combination of elbow shaped conduit members, one of which has a cylindrical gasket recess adjacent its open end, the other conduit member having an end portion fitting rotatably within a portion of the recess to provide an annular sleeve bearing between the members, the last mentioned conduit member having a journal and the recessed conduit member having a socket for receiving the journal, this journal and socket bearing being coaxial with the sleeve bearing whereby said conduit members have relative rotation only on a single axis, and an annular gasket confined within the recess and bearing endwise against the conduit portion that is rotatably mounted in this recess, the gasket being forced into sealing engagement with both conduit members by the fluid pressure within the conduit structure.

JOHN H. PHILLIPS.